3,705,249
COMPOSITIONS AND METHODS FOR TREATING AMOEBIC AND BACTERIAL INTESTINAL INFECTIONS
Erika Bohni, Basel, Rudolf Ruegg, Bottmingen, and Gottlieb Ryser, Basel, Switzerland, assignors to Hoffmann-La Roche Inc., Nutley, N.J.
No Drawing. Filed July 16, 1971, Ser. No. 163,442
Claims priority, application Switzerland, July 24, 1970, 11,237/70
Int. Cl. A61k *27/00*
U.S. Cl. 424—274        5 Claims

ABSTRACT OF THE DISCLOSURE

Compositions therapeutically useful as amoebicides and intestinal antispetics and containing as the active ingredient 1-methyl-4-nitro - pyrrole-2-aldehyde thiosemicarbazone are described.

DETAILED DESCRIPTION OF THE INVENTION

The present invention is directed to therapeutically active compositions containing as the active ingredient 1-methyl-4-nitropyrrole - 2 - aldehyde thiosemicarbazone which may be structurally represented as follows:

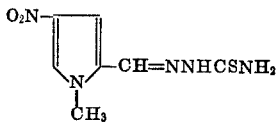

The compositions of the invention are therapeutically useful as amoebicides and as intestinal antiseptics, i.e., against intestinal pathogenic microorganisms. The compositions of the invention have been found to be particularly active against gram-negative bacteria, especially against *Escherichia coli*, *Shigella flexneri* and *Shigella sonnei* in mammals. The highly-favorable activity-toxicity ratio of 1-methyl-4-nitro-pyrrole-2-aldehyde thiosemicarbazone renders the compositions of the invention particularly useful for the treatment of the dysentery and dyspepsia associated with such amoebic and bacterial intestinal infections.

The activity of 1-methyl-4-nitro-pyrrole-2-aldehyde thiosemicarbazone against *E. coli*, *S. sonnei* and *S. flexneri* is favorably comparable with the prior art intestinal antiseptic compound 5-chloro-8-hydroxy-7-iodo-quinoline as demonstrated by the following procedures.

Groups of 5 mice were de-wormed and placed on a carbohydrate-rich diet (popcorn) for four days. Food was discontinued on day five and given on alternate days thereafter. From day six on the mice were given drinking water containing 4.0 g. dihydrostreptomycin, 100 mg. of erythromycin was 400,000 units of mycostatin per liter. On day eight the mice were infected orally with 100 million stremptocyin-, erythromycin- or mycostatin-resistant organisms of *S. sonnei*, *S. flexneri* or *E. coli*. Starting with day nine, food was given every day. 1-methyl-4-nitropyrrole-2-aldehyde thiosemicarbazone was administered *per os* at 24 hour intervals from the time of infection. The compound was administered three times to mice infected with *S. sonnei* and *E. coli* and the mice sacrificed three days after cessation of treatment. The compound was also administered five times to those infected with *S. flexneri* and the mice sacrificed one day after cessation of treatment.

A section of large intestine with contents (about 200 mg.) was isolated and homogenized. Dilutions of 1 to 10,000; 50,000; 100,000; 500,000; 1,000,000 and 2,000,000 were prepared. A drop of each dilution was streaked on an agar plate. The agar plates were incubated 48 hours, the colonies counted and the organism-count per gram of intestinal section for each mouse calculated therefrom. By comparison against controls, the percentage organism reduction for each mouse was calculated and expressed in $CD_{50}$ value. These values as well as those for the standard intestinal antiseptic 5-chloro-8-hydroxy-7-iodoquinoline are set forth in the following table.

TABLE

| Substance | $CD_{50}$, mg./kg., p.o. | | |
|---|---|---|---|
| | E. coli | S. flexneri | S. sonnei |
| 1-methyl-4-nitro-pyrrole-2-aldehyde thiosemicarbazone | <3 | 1.5–3 | 7.5 |
| 5-chloro-8-hydroxy-7-iodoquinoline | 19 | 25 | 25 |

The efficacy of 1-methyl-4-nitro-pyrrole-2-aldehyde thiosemicarbazone is clearly evident from the foregoing data as a 50% cure was effected upon oral administration of 1.5 to 7.5 mg./kg. The acute toxicity of the compound over the 10 day test was found to be over 5000 mg./kg. In comparison, the known intestinal antiseptic 5-chloro-8-hydroxy-7-iodoquinoline required a dosage of 19–25 mg./kg. to effect a 50% cure and demonstrated an acute toxicity of 700 mg./kg. over the 10 day test.

Further, 1-methyl-4-nitro-pyrrole-2-aldehyde thiosemicarbazone has been found to possess amoebicidal activity as is demonstrated by the following procedure utilizing *E. histolytica*. Albino rats weighing 35–45 g. were infected utilizing *E. histolytica*. Groups of six rats were treated at 24 hour intervals after infection with three doses of 1-methyl-4-nitro-pyrrole - 2 - aldehyde thiosemicarbazone and, as a standard, 5-chloro-8-hydroxy-7-iodo-quinoline. For each experiment a group of six rats served as untreated controls. The animals were sacrificed on day six after infection and scrapings of caecal mucosa examined microscopically for live amoeba. An $ED_{50}$, i.e., mg./kg. p.o. required to render 50% of the rats amoeba-free, of 30 was found for 1-methyl-4-nitro-pyrrole-2-aldehyde thiosemicarbazone. In comparison, 5-chloro-8-hydroxy-7-iodoquinoline was found to have an $ED_{50}$ of 70.

In accordance with the invention compositions containing 1-methyl-4-nitro-pyrrole - 2 - aldehyde thiosemicarbazone with suitable pharmaceutically acceptable carrier materials are administered orally. Such pharmaceutical preparations contain from 100 mg. to 600 mg., preferably 100 mg. to 250 mg. of 1-methyl-4-nitro-pyrrole-2-aldehyde thiosemicarbazone. The active ingredient comprises from about 25% to about 75% by weight of said preparations.

In the treatment of intestinal amoebiasis utilizing the compositions of the invention, it is preferred to administer up to 1000 mg. a day, corresponding to 14 mg./kg./day over a treatment period of from 5 to 10 days. This dosage, which may be adjusted by the clinician according to the age of the patient, severity of infection and the like, is preferably administered in the form of tablets which contain 100 mg., 200 mg., or 250 mg. of 1-methyl-4-nitropyrrole-2-aldehyde thiosemicarbazone. Wherein the compositions of the invention are being utilized in the treatment of dysenteries, dyspepsias and amoebiasis in warm-blooded animals other than humans, this dosage can be adjusted as is recognized in the art. The dosage range in accordance with the invention can generally be stated as being between 5 mg. and 30 mg./kg./day, preferably between 10 mg. and 20 mg./kg./day and more preferably about 14 mg./kg./day.

In accordance with the invention 1-methyl-4-nitro-pyrrole-2-aldehyde thiosemicarbazone is administered orally in the form of pharmaceutically acceptable dosage units, i.e., tablets, capsules, dragées and the like. Such dosage units are produced by admixing the active ingredient with conventional pharmaceutical inert carrier materials by methods well known in the art of pharmaceutical compounding. Examples of suitable inert carrier materials include organic and inorganic substances such as, lactose, sorbitol, mannitol, starches such as, potato starch, maize starch or amylopectin; lubricants such as, magnesium or calcium stearate or polyethylene glycols of suitable molecular weight, and the like. The tablets may be coated, e.g., with concentrated sugar solutions which can also contain substances such as gum arabic, talcum and/or titanium dioxide, or with a lacquer dissolved in easily volatile organic solvents or mixtures of such solvents. Dyestuffs can be added to these coatings, e.g., to distinguish between dosage forms containing different amounts of active substance.

The following examples further illustrate the invention.

Example 1

Capsules of the following composition were manufactured as follows:

|  | Mg. |
|---|---|
| 1 - methyl - 4 - nitro - pyrrole - 2 - aldehyde thiosemicarbazone | 100 |
| Lactose | 125 |
| Corn starch | 30 |
| Talc | 5 |
| Total | 260 |

The 1-methyl-4-nitro-pyrrole-2-aldehyde thiosemicarbazone was mixed with the lactose and the corn starch in a suitable mixer. The mixture was then passed through a comminuting machine and led back into the mixer where the talc was added thereto. The mixture was thoroughly blended and filled into No. 4 gelatin capsules.

Example 2

Tablets of the following composition were manufactured as follows:

|  | Mg. |
|---|---|
| 1 - methyl - 4 nitro - pyrrole - 2 - aldehyde thiosemicarbazone | 200.0 |
| Lactose | 144.0 |
| Corn starch | 4.0 |
| Calcium stearate | 2.0 |
| Total | 350.0 |

The 1-methyl-4-nitro-pyrrole-2-aldehyde thiosemicarbazone and the other ingredients were well mixed in a suitable blender. The mixture was compressed on a tabletting machine to slugs of about 2.5 cm. diameter and 0.8 cm. thickness. The slugs were then comminuted to form a granulate (about 1.2 mm.). The granulate thus-obtained was then compressed to tablets weighing 350 mg.

Example 3

Dragees of the following composition were manufactured as follows:

| Core: | Mg. |
|---|---|
| 1 - methyl - 4 - nitro - pyrrole - 2 - aldehyde thiosemicarbazone | 250 |
| Mannitol | 80 |
| Talc | 5 |
| Corn starch | 15 |
| Core weight | 350 |

| Coating mass: | Mg. |
|---|---|
| Sugar, 90% | ⎫ |
| Rice starch, 5% | ⎬ 150 |
| Talc, 5% | ⎭ |
| Core weight | 350 |
| Coating mass weight | 150 |
| Total weight | 500 |

The 1-methyl-4-nitro-pyrrole-2-aldheyde thiosemicarbazone was mixed with mannitol and passed through a No. 5 sieve (mesh-width about 0.23 mm.). The corn starch was boiled with sufficient water to yield a 10% paste. The powder mixture was then homogeneously ground with this paste. The slightly moist mass was granulated by passage through a No. 3 sieve (mesh-width about 1.0 mm.). The granulate was dried and mixed with the talc. The resulting mixture was compressed to biconvex cores of 350 mg. weight having a diameter of approximately 8.0 mm.

These cores were coated with sufficient sugar to bring the weight of each dragee to 500 mg. by utilizing the conventional sugar syrup dredging process.

We claim:

1. A pharmaceutical composition for the therapeutic treatment of infections caused by intestinal pathogenic microorganisms selected from the group consisting of amoeba and bacteria in the form of a tablet, capsule or dragee comprising as an active ingredient from about 100 mg. to about 600 mg. of 1-methyl-4-nitro-pyrrole-2-aldehyde thiosemicarbazone and a therapeutically inert, pharmaceutically acceptable carrier material.

2. A pharmaceutical composition in accordance with claim 1 wherein each such dosage unit contains 250 mg. of 1-methyl-4-nitro-pyrrole-2-aldehyde thiosemicarbazone.

3. A method for the therapeutic treatment of infections in a mammalian host caused by intestinal pathogenic microorganisms selected from the group consisting of amoeba and bacteria which comprises orally administering to said host an effective amount of the composition of claim 1.

4. The method in accordance with claim 3 wherein said composition is administered in an amount equal to from about 10 mg./kg./day to about 20 mg./kg./day based on the body weight of said mammalian host.

5. The method of claim 3 wherein said composition is administered in an amount equal to about 14 mg./kg./day based on the body weight of said mammalian host.

References Cited

Chemical Abstracts 56: 5912g to 5913a (1962).

JEROME D. GOLDBERG, Primary Examiner